(12) United States Patent
Wakiyama et al.

(10) Patent No.: US 7,910,673 B2
(45) Date of Patent: Mar. 22, 2011

(54) ANTISTATIC AGENT FOR THERMOPLASTIC RESIN AND ANTISTATIC RESIN COMPOSITION

(75) Inventors: Satoru Wakiyama, Kanagawa (JP); Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/536,071

(22) Filed: Aug. 5, 2009

(65) Prior Publication Data
US 2010/0041833 A1    Feb. 18, 2010

(30) Foreign Application Priority Data

Aug. 12, 2008 (JP) ................................ 2008-208138

(51) Int. Cl.
*C08F 12/30* (2006.01)
(52) U.S. Cl. ......... 526/287; 526/346; 525/212; 525/189
(58) Field of Classification Search .................. 526/287, 526/346; 525/212, 189
See application file for complete search history.

(56) References Cited

U.S. PATENT DOCUMENTS 5,759,708 A * 6/1998 Tarasevich et al. ........... 428/689

FOREIGN PATENT DOCUMENTS

| JP | 07-149993 |   | 6/1995 |
|----|-----------|---|--------|
| JP | 09-188873 |   | 7/1997 |
| JP | 09-188873 | * | 9/1997 |
| JP | 10-140142 |   | 5/1998 |
| JP | 10-231328 |   | 9/1998 |
| JP | 10-316960 |   | 12/1998 |
| JP | 11-189769 |   | 7/1999 |
| JP | 11-236555 |   | 8/1999 |
| JP | 2000-198816 |  | 7/2000 |
| JP | 2003-041133 | * | 2/2003 |
| JP | 2006-104450 |  | 4/2006 |
| JP | 2007-063514 |  | 3/2007 |

OTHER PUBLICATIONS

Japanese Office Action issued on Oct. 26, 2010, for corresponding Japanese Patent Application JP-2008-208138.

* cited by examiner

*Primary Examiner* — Ling-Siu Choi
(74) *Attorney, Agent, or Firm* — K&L Gates LLP

(57) ABSTRACT

An antistatic agent for a thermoplastic resin is provided and includes a sulfonate group introduced into a surface layer part of an aromatic ring-containing thermoplastic resin.

8 Claims, 5 Drawing Sheets

ANTISTATIC AGENT FOR THERMOPLASTIC RESIN AND ANTISTATIC RESIN COMPOSITION

CROSS REFERENCES TO RELATED APPLICATIONS

The present application claims priority to Japanese Priority Patent Application JP 2008-208138 filed in the Japan Patent Office on Aug. 12, 2008, the entire contents of which is hereby incorporated by reference.

BACKGROUND

The present disclosure relates to an antistatic agent for thermoplastic resin capable of imparting conductivity to thermoplastic resin compositions and an antistatic resin composition containing this antistatic agent for thermoplastic resin.

In general, though plastic materials are widely used because of excellent characteristics thereof, they are electrically insulating and have such properties that they are easily charged with static electricity. For that reason, dust attaches to a plastic molded article, whereby its appearance is impaired. Also, when the plastic material is used for cases or parts of electric or electronic devices, there may be the case where malfunctioning of the device or a fault of electronic parts such as IC is caused due to discharge of static electricity. For that reason, there have hitherto been developed various technologies regarding the prevention of electrification of plastics. For example, it is generally carried out to add an antistatic agent of a surfactant type to a plastic. However, in such a method, though short-term antistatic properties are excellent, the antistatic properties cannot be kept for a long period of time, and therefore, there is involved a problem regarding the durability.

Also, there is a method for kneading a conductive inorganic material such as a carbon fiber and carbon black into a plastic material for the purpose of imparting persistent antistatic properties. In this method, since the plastic material is colored by a black color of the foregoing carbon fiber or the like, there is involved a problem that the color tone of a plastic material which can be used is limited to the black color.

In addition to this, there is disclosed a method for using a sulfonated polystyrene jointly with an organic base or a silicone (see, for example, JP-A-9-188873, JP-A-10-140142, JP-A-10-231328, JP-A-10-316960, JP-A-11-189769, JP-A-11-23655 and JP-A-200341133). It cannot be said that the sulfonated polystyrene which is used in this method is thoroughly satisfactory in view of the antistatic effect. Also, the sulfone group is introduced into the whole of the resin, and there is a defect that blocking between the resins is easily generated by moisture absorption.

Therefore, it is desirable to provide an antistatic agent thermoplastic resin which is excellent in an antistatic effect, is able to reveal antistatic properties for a long period of time and is excellent in durability and an antistatic resin composition containing this antistatic agent for thermoplastic resin.

Also, it is desirable to provide an antistatic agent for thermoplastic resin which is excellent in both handling and antistatic performance as compared with existing antistatic agents for thermoplastic resin and an antistatic resin composition containing this antistatic agent for thermoplastic resin.

SUMMARY

It has been found that by introducing a prescribed amount of a sulfonate group into a particle surface layer part of a thermoplastic resin of a polymer, an antistatic agent for thermoplastic resin having an antistatic effect and having excellent handling and long-term antistatic performance can be obtained.

That is, an embodiment is directed to an antistatic agent for thermoplastic resin having a sulfonate group introduced into a surface layer part of an aromatic ring-containing thermoplastic resin.

Also, another embodiment is directed to an antistatic resin composition including an antistatic agent for thermoplastic resin having a sulfonate group introduced into a surface layer part of an aromatic ring-containing thermoplastic resin; and a thermoplastic resin.

Since the antistatic agent for thermoplastic resin according to the embodiment has a sulfonate group as an antistatic factor only in a surface layer part of a thermoplastic resin, the hygroscopicity as a whole of a particle of the resin is kept low. For that reason, the antistatic agent for thermoplastic resin according to the embodiment is free from blocking between the particles, does not lower in blending properties with a thermoplastic resin and makes it possible to impart antistatic properties to a thermoplastic resin to which this antistatic agent for thermoplastic resin is added.

This antistatic agent for thermoplastic resin and the antistatic resin composition having this antistatic agent added thereto are excellent in an antistatic effect, are able to reveal antistatic properties for a long period of time and are excellent in durability and handling properties.

Additional features and advantages are described herein, and will be apparent from the following Detailed Description and the figures.

BRIEF DESCRIPTION OF THE FIGURES

FIGS. 2A and 2B are each a drawing showing a relation between a sectional structure of the antistatic agent for thermoplastic resin shown in FIG. 1 and distribution of secondary ion intensity, in which FIG. 2A shows the sectional structure of the antistatic agent for thermoplastic resin, and FIG. 2B shows the distribution of secondary ion intensity.

FIGS. 4A, 4B and 4C are each a drawing showing distribution of a secondary ion in an antistatic agent for thermoplastic resin of Sample 1, in which FIG. 4A is a photograph expressing the antistatic agent for thermoplastic resin, FIG. 4B is a schematic view of a section of the antistatic agent for thermoplastic resin shown in FIG. 4A, and FIG. 4C is a graph expressing the distribution of secondary ion intensity of the antistatic agent for thermoplastic resin.

FIGS. 5A, 5B and 5C are each a drawing showing distribution of a secondary ion in an antistatic agent for thermoplastic resin of Comparative Sample 1, in which FIG. 5A is a photograph expressing the antistatic agent for thermoplastic resin, FIG. 5B is a schematic view of a section of the antistatic agent for thermoplastic resin shown in FIG. 5A, and FIG. 5C is a graph expressing the distribution of secondary ion intensity of the antistatic agent for thermoplastic resin.

DETAILED DESCRIPTION

The antistatic agent for thermoplastic resin and the antistatic resin composition, to which the present embodiment is applied, are hereunder described in detail with reference to the accompanying drawings.

The antistatic resin composition to which the present embodiment is applied is a resin material which is used for, for example, household electrical appliances, automobile products, office equipment, stationeries, miscellaneous goods, building materials, fibers, etc. and when an antistatic agent is contained in the resin composition which is an electrostatic resin, is imparted antistatic properties.

Figure 1:
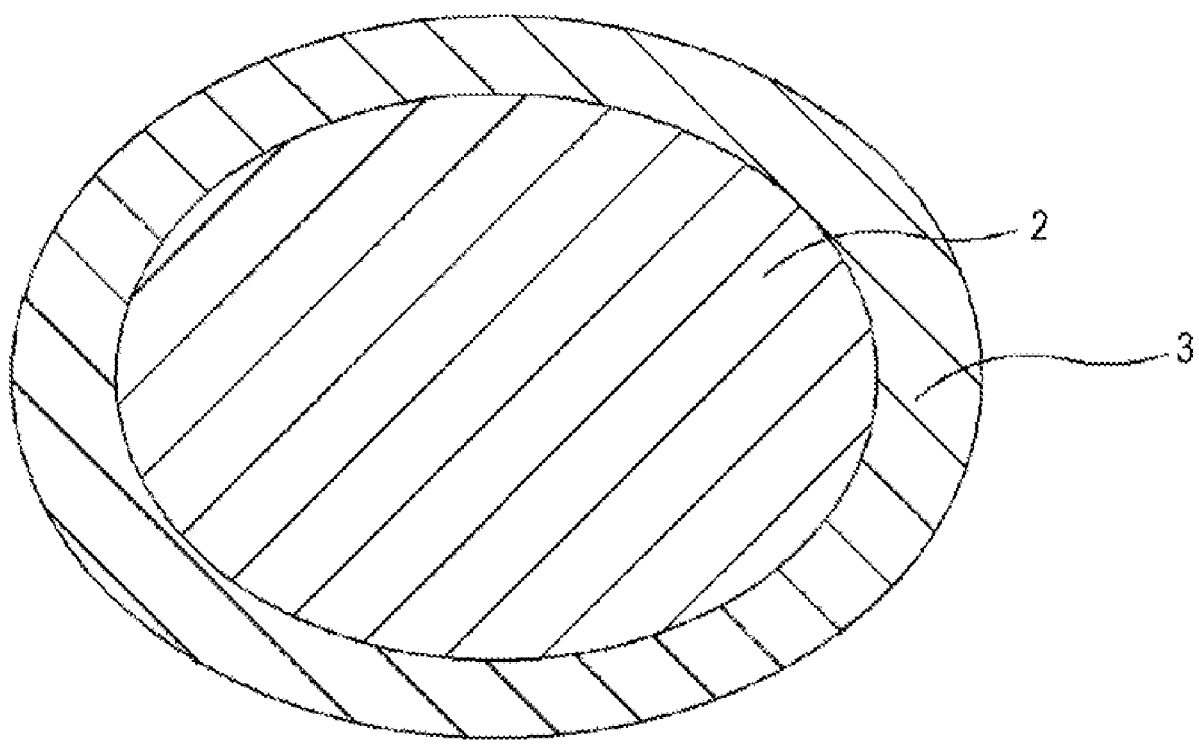
FIG. 1 is a sectional view of an antistatic agent for thermoplastic resin in an embodiment.

An antistatic agent 1 for thermoplastic resin which is contained in the antistatic resin composition is an antistatic agent for thermoplastic resin in which a prescribed amount of a sulfonate group is introduced into a particle surface layer part of a polymer. Specifically, the antistatic agent 1 for thermoplastic resin is formed of an inner layer part 2 and a surface layer part 3 as shown in FIG. 1. The inner layer part 2 is formed of a granular polymer. The surface layer part 3 is configured to include a polymer having a sulfonate group bonded thereto. The polymer of the surface layer part 3 is constituted of the same polymer as the polymer which is contained in the inner layer part 2. That is, the surface layer part 3 is one formed by bonding a sulfonate group onto the surface layer of the inner layer part 2 composed of a granular polymer.

Specifically, the polymer constituting the antistatic agent 1 for thermoplastic resin is a polymer containing an aromatic ring in a molecule thereof in a thermoplastic resin.

Examples of the thermoplastic resin containing an aromatic ring in a molecule thereof include polystyrene (PS), high-impact polystyrene (HIPS: a styrene-butadiene copolymer), an acrylonitrile-styrene copolymer (AS), an acrylonitrile-butadiene-styrene copolymer (ABS), an acrylonitrile-styrene-acrylate copolymer (ASA), an acrylonitrile-ethylene propylene rubber-styrene copolymer (AES), an acrylonitrile-ethylene-propylene-diene-styrene resin (AEPDMS), polycarbonate (PC), polyphenylene oxide (PPO), polyethylene terephthalate (PET) and polybutylene terephthalate (PBT). Of these, any one kind or a mixture of plural kinds thereof can be used.

Also, as the thermoplastic resin into which a sulfonate group is introduced, a mixture (alloy) of the foregoing polymer and other polymer or the like may be used. Specific examples of such a mixture (alloy) which can be used include at least one member of an ABS/PC alloy, a PS/PC alloy, an AS/PC alloy, an HIPS/PC alloy, a PET/PC alloy, a PBT/PC alloy, a PVC/PC alloy, a PLA (polylactic acid)/PC alloy, a PPO/PC alloy, a PS/PPO alloy, an HIPS/PPO alloy, an ABS/PET alloy and a PET/PBT alloy. Of these polymers, PS, AS, HIPS, ASA, PC, PPE, PET and ABS are especially favorable.

As the foregoing polymer, for example, recycled materials from spent materials and remnants discharged in factories can also be used. That is, by using a recycled material as a raw material, it is possible to devise to effectively utilize resources or reduce costs.

Since the foregoing polymer contains an aromatic ring in a molecule thereof, it is easy to introduce a sulfonate group as described later.

A content of the aromatic ring which is constituted (contained) in the polymer is from 1% by mole to 100% by mole, preferably from 20% by mole to 100% by mole, and more preferably from 50% by mole to 100% by mole. By making the content of the aromatic ring fall within the range of from 1% by mole to 100% by mole, a rate of introduction of a sulfonate group is not excessively low but adequate, and the antistatic effect as the antistatic agent 1 for thermoplastic resin can be thoroughly obtained.

A weight average molecular weight of the foregoing polymer into which a sulfonate group is introduced is preferably in the range of from 100,000 to 300,000. By making the weight average molecular weight of the polymer fall within the range of from 100,000 to 300,000, the mechanical characteristic and heat resistance of the thermoplastic resin in which the antistatic agent 1 for thermoplastic resin having a sulfonate group introduced thereinto is added are not lowered, the antistatic agent 1 for thermoplastic resin is uniformly dispersed in the thermoplastic resin, namely the compatibility is not lowered, and antistatic properties can be adequately imparted to a resin to be imparted with antistatic properties (thermoplastic resin) to which the antistatic agent 1 for thermoplastic resin is added.

With respect to a particle size of the polymer, it is preferable that the weight of a product passing through a 60-mesh screen is 30% by weight or more and that the weight of a product passing through an 80-mesh screen is 10% by weight or more; it is more preferably that the weight of a product passing through a 60-mesh screen is 50% by weight or more and that the weight of a product passing through an 80-mesh screen is 30% by weight or more; and it is further preferable that the weight of a product passing through a 60-mesh screen is 70% by weight or more and that the weight of a product passing through an 80-mesh screen is 50% by weight or more.

By controlling the particle size of the polymer such that the weight of a product passing through a 60-mesh screen is 30% by weight or more and that the weight of a product passing through an 80-mesh screen is 10% by weight or more, a lowering of the rate of introduction of a sulfonate group into the polymer can be prevented from occurring; the particle of the antistatic agent 1 for thermoplastic resin does not become excessively large, and dispersion of the antistatic agent 1 for thermoplastic resin in an antistatic resin (thermoplastic resin) constituting the antistatic resin composition becomes uniform. Also, by making the particle size of the polymer fall within the foregoing range, a problem is not particularly generated in a sulfonation reaction; the particle system of a sulfonated product after the reaction does not become excessively small; and a countermeasure against dusts is not required.

In order to obtain a polymer having the foregoing particle size, the polymer may be subjected to pulverization (for example, freeze pulverization using liquid nitrogen, etc.), or in manufacturing a polymer from a monomer, the particle size may be regulated by adopting a polymerization method of every sort (for example, suspension polymerization, block polymerization, pearl polymerization, etc.) under a condition in the polymerization stage.

The moisture to be contained in the polymer can be confirmed by measuring a weight of the polymer before and after drying (for example, vacuum drying, drying by air-circulation heating, etc.) or adopting the Karl Fischer moisture measurement method or by other means. The moisture content of the polymer is not more than 3.5%. preferably not more than 2%, and more preferably not more than 1%.

By regulating the moisture content of the polymer at not more than 3.5%, in sulfonating the surface layer of the polymer, the moisture contained in the particle surface layer part does not first react with a sulfonating agent as described later, and inhibition of a reaction of the polymer itself (aromatic ring) with a sulfonating agent can be prevented from occurring. Namely, a significant lowering of the rate of introduction of a sulfonate group into the polymer can be prevented from occurring.

In the foregoing polymer, in view of the fact that a prescribed amount of the sulfonate group is introduced into the aromatic ring in the surface layer, in blending in a resin to be imparted with antistatic properties, the antistatic agent 1 for thermoplastic resin capable of imparting high antistatic properties is obtained. That is, when the antistatic agent 1 for thermoplastic resin having the surface layer part 3 which is formed by introducing a sulfonate group into the surface layer of the inner layer part 2 composed of a polymer is blended in a resin to be imparted with antistatic properties, high antistatic properties can be imparted.

Examples of a method for introducing a sulfonate group into the surface layer of the inner layer part 2 composed of the foregoing polymer include a method for sulfonating the polymer with a prescribed amount of a sulfonating agent.

In that case, examples of the sulfonating agent which can be used for the sulfonation of the polymer include sulfuric anhydride, fuming sulfuric acid, chlorosulfonic acid, a polyalkylbenzene sulfonic acid and concentrated sulfuric acid. These compounds can be used singly or in admixture of plural kinds thereof.

In particular, in the case where a substituent which is easily hydrolyzable, such as a cyano group, is contained in the polymer, when moisture is contained in the sulfonating agent, the hydrolysis as a side reaction is promoted, and therefore, it is preferred to use a sulfonating agent having a low moisture content as far as possible. As the sulfonating agent having a low moisture content, specifically, it is desirable to use sulfuric anhydride, fuming sulfuric acid, chlorosulfonic acid or a polyalkylbenzene sulfonic acid. Of these, sulfuric acid or fuming sulfuric acid is more preferable. A standard of the moisture content in the sulfonating agent is not more than 3% by weight, and preferably not more than 1% by weight. By controlling the moisture content in the sulfonating agent at not more than 3% by weight, a hydrolysis reaction hardly occurs regardless of the kind of the polymer (for example, one containing a nitrile group), and inhibition of the sulfonation reaction can be prevented from occurring. Accordingly, it is possible to prevent a lowering of the rate of introduction of a sulfonate group into the polymer particle surface layer of the inner layer part 2 from occurring.

Examples of a method for introducing a sulfonate group into the polymer particle surface layer of the inner layer part 2 include a method for directly adding the polymer particle to the sulfonating agent to achieve the reaction. In addition to this, there is a method for adding the sulfonating agent in a liquid form or a gaseous form in a state that the polymer particle is dispersed (but not dissolved) in an organic solvent. Also, there is a method for directly blowing an $SO_3$ gas into the polymer particle to achieve the reaction. Of these methods, a method for allowing the polymer to react directly with the sulfonating agent or directly achieve the reaction in a gaseous state is more preferable.

The introduction into the surface layer of the inner layer part 2 composed of a polymer is carried out in a state of a sulfonate group. Specific examples of the sulfonate group include sulfonic acid metal salt groups such as a sodium sulfonate group, a potassium sulfonate group, a lithium sulfonate group, a calcium sulfonate group, a magnesium sulfonate group, an aluminum sulfonate group, a zinc sulfonate group, an antimony sulfonate group and a tin sulfonate group. In the antistatic agent 1 for thermoplastic resin, a potassium sulfonate is favorable.

In the antistatic agent 1 for thermoplastic resin, a thickness of the surface layer part 3 which is formed by introducing a sulfonate group into the surface layer of the inner layer part 2 composed of a polymer particle is not more than ½, preferably not more than ⅕, and more preferably not more than ¹⁄₁₀ relative to the diameter of the antistatic agent 1 for thermoplastic resin.

By controlling the thickness of the surface layer part 3 having a sulfonate group introduced thereinto at not more than ½ relative to the diameter of the polymer particle (antistatic agent 1 for thermoplastic resin), water absorption properties of the antistatic agent 1 for thermoplastic resin do not become high, the generation of blocking in the antistatic agent 1 for thermoplastic resin can be prevented from occurring; and lowerings in mechanical characteristics, stability with time (especially under high temperature and high humidity) and recycle properties of the resin to be imparted with antistatic properties having the antistatic agent 1 for thermoplastic resin added thereto can be prevented from occurring.

The thickness of the surface layer part 3 can be easily determined by measuring a section of the particle of the antistatic agent 1 for thermoplastic resin by means of, for example, TOF-SIMS (time-of-flight-secondary ion mass spectrometry).

Figure 2A:
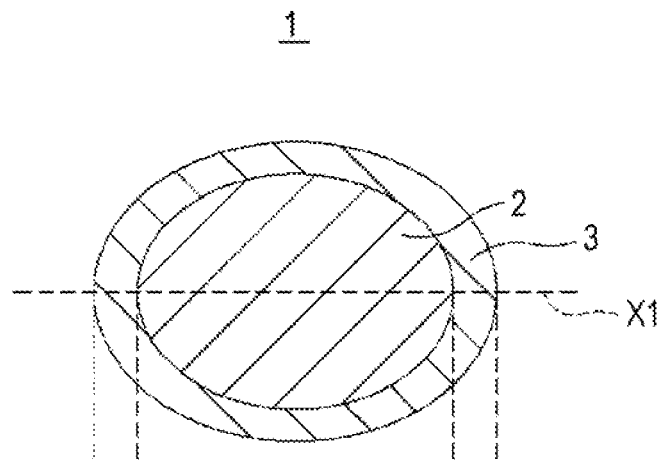
Figure 2B:
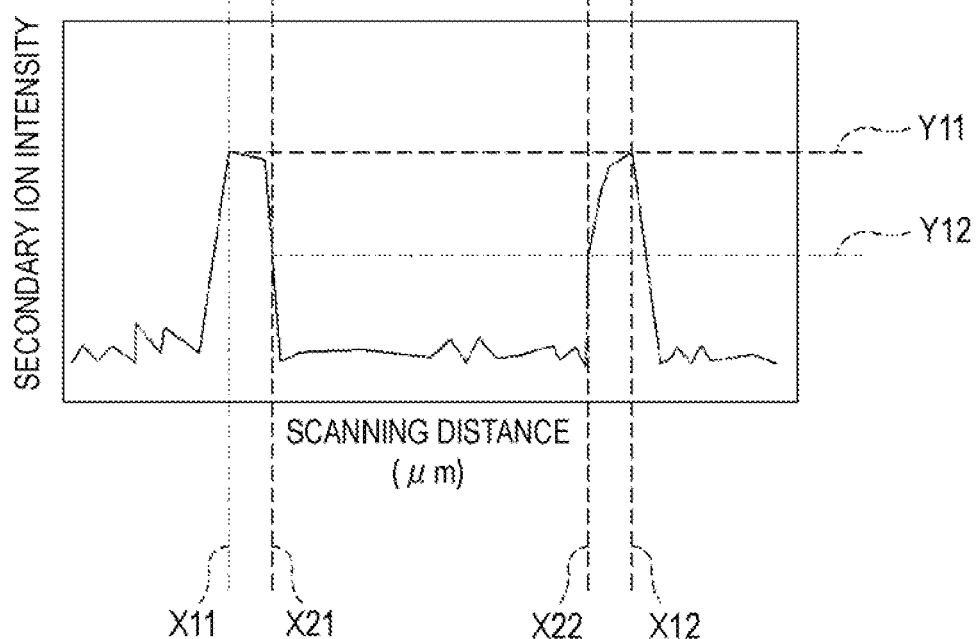

Specifically, a "proportion of the thickness of the surface layer part 3" is explained with reference to the case of measurement by means of TOF-SIMS as an example. FIG. 2A schematically shows a sectional configuration in a substantial center of the antistatic agent 1 for thermoplastic resin. FIG. 2B schematically shows the distribution of secondary ion intensity of a sulfur element in the case of achieving the measurement along a dotted line X1 in FIG. 2A, in which the abscissa represents a scanning distance (μm), and the ordinate represents a secondary ion intensity. When the secondary ion intensity of the sulfur element is measured while scanning the section of the antistatic agent 1 for thermoplastic resin along the dotted line X1 of FIG. 2A by means of TOF-SIMS, two large peaks to be caused due to sulfur of the sulfonate group which the surface layer part 3 has are detected as shown in FIG. 2B. In that case, when positions of outer edges of the antistatic agent 1 for thermoplastic resin are defined as scanning distances X11 and X12 at a maximum value Y11 of the secondary ion intensity in the two peaks, a particle size (μm) of the antistatic agent 1 for thermoplastic resin is calculated from a difference therebetween {(scanning distance X12)−(scanning distance X11)}. Also, when a position of an interface between the inner layer part 2 and the surface layer part 3 is made to exist between the scanning distances X11 and X12, and scanning distances at Y12 which is a 50% value of the maximum value Y11 are defined as X21 and X22, respectively, a size (μm) of the inner layer part 2 is calculated from a difference therebetween {(scanning distance X22) (scanning distance X21)}. A proportion (%) of the thickness of the surface layer part 3 [=[{(particle size of the antistatic agent 1 for thermoplastic resin)−(size of the inner layer part 2)}/(particle size of the antistatic agent 1 for thermoplastic resin)]×100] is calculated from the particle size of the antistatic agent 1 for thermoplastic resin and the size of the inner layer part 2. Needless to say, the proportion of the thickness of the surface layer part 3 is not limited to the foregoing measurement method and calculation method so far as it can be calculated.

The rate of introduction of a sulfonate group into the surface layer of the inner layer part 2 composed of a polymer is preferably in the range of from 0.6% by weight to 13% by weight, and more preferably in the range of from 0.6% by weight to 6% by weight in terms of a sulfur content relative to the whole weight of the antistatic agent for thermoplastic resin.

By controlling the rate of introduction of a sulfonate group into the polymer at 0.6% by weight or more, antistatic properties can be imparted to the antistatic resin composition. Also, by controlling the rate of introduction of a sulfonate group into the polymer at not more than 13% by weight, the water absorption properties of the antistatic agent 1 for thermoplastic resin do not become high; blocking in the antistatic agent 1 for thermoplastic resin is not generated; the compatibility with the resin composition is not lowered; and deterioration with time of the mechanical strength of the antistatic resin composition can be prevented from occurring.

The rate of introduction of a sulfonate group into the surface layer of the inner layer part 2 can be easily determined by, for example, quantitatively analyzing the sulfur (S) component contained in the sulfonated polymer by a combustion flask method or the like.

Then, with respect to the sulfonate group to be introduced into the surface layer of the inner layer part 2, it is possible to regulate its rate of introduction and introduction depth of the sulfonate group by regulating a condition such as reaction temperature at the time of sulfonation, reaction time, reaction pressure, addition amount of the sulfonating agent, addition amount of a Lewis base and particle size of the polymer. Of these, it is more preferable that the rate of introduction and introduction depth of the sulfonate group is regulated by regulating the particle size (surface area) of the polymer, the addition amount of the sulfonating agent or the reaction pressure, time and temperature in reacting with the sulfonating agent.

In the antistatic agent 1 for thermoplastic resin, the surface layer part 3 may be formed so as to cover the entirety of the surface layer of the inner layer part 2, or may be formed in a part of the surface layer of the inner layer part 2. Also, the surface layer part 3 may not be formed in a layered state.

Figure 3:
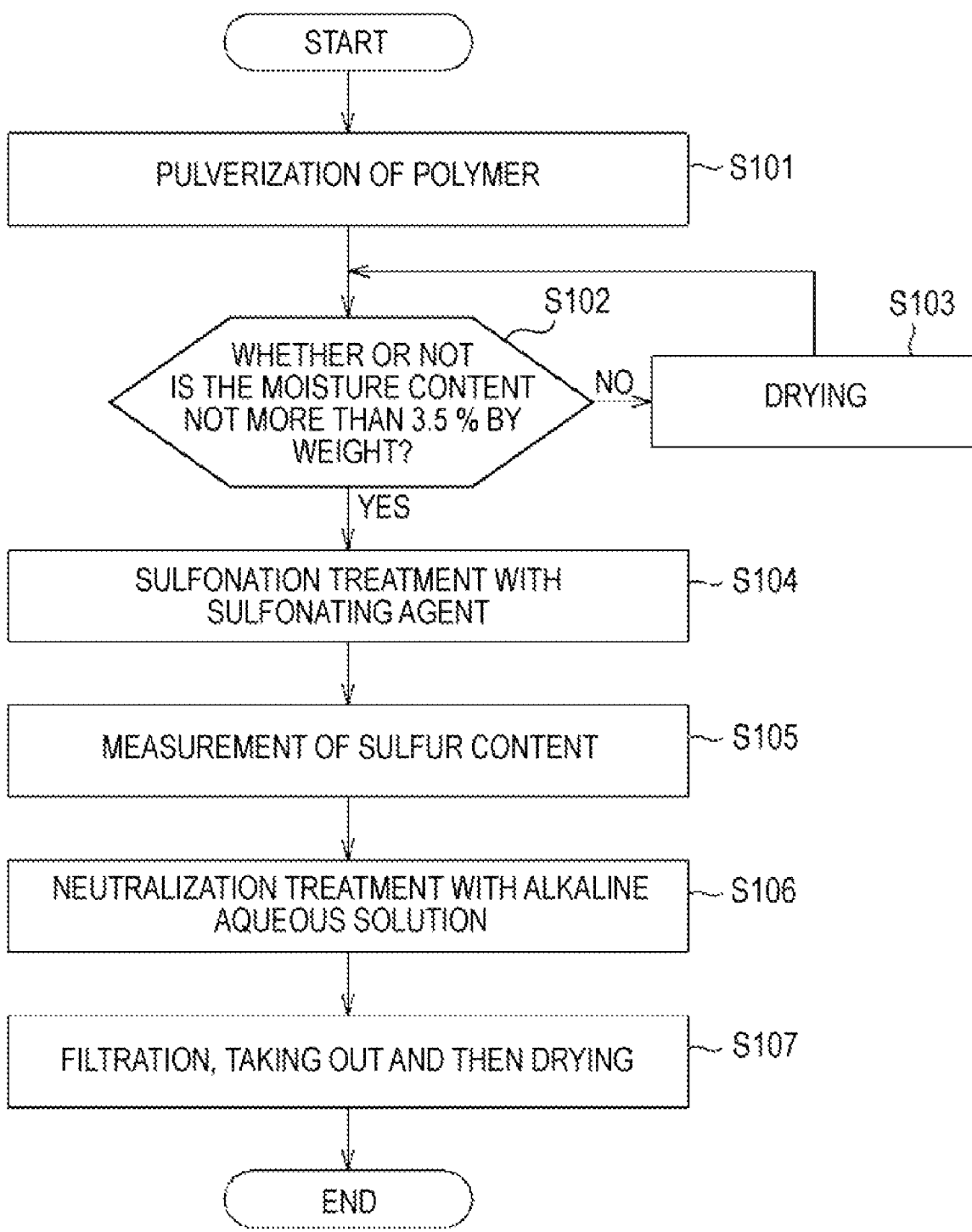
FIG. 3 is flow diagram expressing a manufacturing method an antistatic agent for thermoplastic resin.

The foregoing antistatic agent 1 for thermoplastic resin can be manufactured through the steps shown in FIG. 3.

First of all, in Step S101, a polymer is pulverized to form a granule. Examples of a method for pulverizing the polymer include a method for undergoing freeze pulverization using liquid nitrogen. As described previously, with respect to the particle size of the polymer, it is preferable that the weight of a product passing through a 60-mesh screen is 30% by weight or more and that the weight of a product passing through an 80-mesh screen is 10% by weight or more.

So far as a granular polymer is available, the pulverization may not be carried out. In that case, in manufacturing the polymer from a monomer, after forming a granule, its particle size may be regulated by adopting a polymerization method of every sort (for example, suspension polymerization, block polymerization, pearl polymerization, etc.) under a condition in the polymerization stage.

Subsequently, in Step 102, whether or not the moisture content of the pulverized polymer is not more than 3.5% by weight is confirmed. In the case where the moisture content of the pulverized polymer exceeds 3.5% by weight ("No" in S102), the process goes to a drying step in Step S103, the pulverized polymer is dried, and thereafter, the moisture content is again confirmed. In the case where the moisture content of the pulverized polymer is not more than 3.5% by weight ("Yes" in S102), the process goes to Step S104, and the granular polymer is subjected to a sulfonation treatment with a sulfonating agent. According to this, a sulfonate group is introduced into the surface layer of the granular polymer, whereby the surface layer part 3 is formed.

Subsequently, in Step S105, the sulfur content is measured for the purpose of confirming whether or not the sulfonation treatment has been carried out well, or whether or not a prescribed amount of the sulfonate group has been introduced. On that occasion, the sulfur content may or may not be measured. In the case where the sulfur content is not measured, the measurement may be carried out after completion of the antistatic agent 1 for thermoplastic resin.

Subsequently, in Step S106, the polymer having the surface layer part 3 formed therein is subjected to a neutralization treatment with an alkaline aqueous solution. According to this, the sulfonating agent is neutralized, whereby the sulfonation reaction is stopped.

Finally, in Step S107, the polymer is separated from the neutralization solution by means of filtration, etc., taken out and then dried. According to this, the antistatic agent 1 for thermoplastic resin having the surface layer part 3 which is formed by introducing a sulfonate group into the surface layer of the inner layer part 2 composed of a polymer is completed.

In the obtained antistatic agent 1 for thermoplastic resin, in view of the fact that the sulfonate group as an antistatic factor is introduced only into the surface layer of the inner layer part 2 composed of a polymer, the hygroscopicity is controlled low. According to this, the antistatic agent 1 for thermoplastic resin is free from blocking between particles and is able to impart antistatic properties to a resin to be imparted with antistatic properties (thermoplastic resin) without lowering blending properties in the resin to be imparted with antistatic properties (thermoplastic resin).

Also, the antistatic agent 1 for thermoplastic resin is excellent in an antistatic effect, is able to reveal antistatic properties for a long period of time and is excellent in durability and handling properties.

The resin to be imparted with antistatic properties, to which the antistatic agent 1 for thermoplastic resin is added, is a thermoplastic resin. In this thermoplastic resin, in view of the fact that a sulfone group existing in the surface layer of the antistatic agent 1 for thermoplastic resin is dispersed in the resin at the time of melt blending with the antistatic agent 1 for thermoplastic resin, antistatic properties are imparted, and the antistatic properties are exhibited.

Examples of the resin to be imparted with antistatic properties serving as a raw material of the resin composition to which antistatic properties are imparted by containing the antistatic resin 1 for thermoplastic resin, namely the antistatic resin composition, include polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polybutylene terephthalate (PBT), polysulfone (PSF), nylon, polylactic acid (PLA) and a liquid crystal polymer (LCP). A resin containing 5% by weight or more of at least one member of these materials can be used. That is, these resins to be imparted with antistatic properties may be used singly or as a mixture (alloy) obtained by mixing plural kinds thereof Also, a mixture (alloy) obtained by mixing at least one member of a natural rubber (NR), IR (isoprene rubber), BR (butadiene rubber), CR (chloroprene rubber), NBR (nitrile rubber), HNBR (hydrogenated nitrile rubber), IIR (butyl rubber), EPDM (ethylene rubber), a silicone rubber (Q) and TPE (thermoplastic elastomer) in the antistatic resin composition may be used.

Examples of the resin to be imparted with antistatic properties (thermoplastic resin) to which antistatic properties are especially effectively imparted by containing the foregoing antistatic resin 1 for thermoplastic resin include at least one resin of PC, an ABS/PC alloy, an AS/PC alloy, a PC/PBT alloy, ABS, a PC/(HI)PS alloy, a PC/PLA alloy, a PVC/PC alloy, a PET/PC alloy, a PPO/PC alloy, an (HI)PS/PPO alloy, ABS, AS, an HIPS/ABS/PET alloy and a PET/PBT alloy.

In this way, by using, as the antistatic agent 1 for thermoplastic resin, a material obtained by introducing a prescribed amount of at least one sulfonate group into the particle surface layer part in a prescribed range of the polymer constituted of an aromatic ring, a number of resins to be imparted with antistatic properties can be made to have antistatic properties.

Also, similar to the foregoing thermoplastic resin of the antistatic agent 1 for thermoplastic resin, for example, recycled materials from spent materials and remnants discharged in factories can also be used for the resin to be imparted with antistatic properties. That is, by using the recycled resin as a raw material, it is possible to devise to reduce costs.

Also, in the antistatic resin composition, a content of the antistatic agent 1 for thermoplastic resin is preferably in the range of from 3.5% by weight to 80% by weight relative to the resin to be imparted with antistatic properties.

By controlling the content of the antistatic agent 1 for thermoplastic resin at 3.5% by weight or more relative to the resin to be imparted with antistatic properties, it is possible to effectively impart antistatic properties to the antistatic resin composition. Also, by controlling the content of the antistatic agent 1 for thermoplastic resin at not more than 80% by weight relative to the resin to be imparted with antistatic properties, a lowering of the mechanical strength of the antistatic resin composition can be prevented from occurring.

Also, in the antistatic resin composition, in addition to the foregoing antistatic agent 1 for thermoplastic resin, for example, antistatic agents which have hitherto been known and the like can also be added for the purpose of further enhancing the antistatic properties.

Examples of the antistatic agent which has hitherto been known include nonionic antistatic agents anionic antistatic agents, cationic antistatic agents, ampholytic antistatic agents and conductive resin based antistatic agents. Of these, any one kind or a mixture of plural kinds thereof can be used.

Specifically, examples of the nonionic antistatic agent include poly(oxyethylene) alkylamides, poly(oxyethylene) alkyl ethers, poly(oxyethylene) alkylphenyl ethers, glycerin fatty acid esters and sorbitan fatty acid esters. Of these, any one kind or a mixture of plural kinds thereof can be used.

Examples of the anionic antistatic agent include alkyl sulfonates, alkylbenzene sulfonates, alkyl sulfates and alkyl phosphates. Of these, any one kind or a mixture of plural kinds thereof can be used.

Examples of the cationic antistatic agent include quaternary ammonium chlorides, quaternary ammonium sulfates and quaternary ammonium nitrates. Of these, any one kind or a mixture of plural kinds thereof can be used.

Examples of the ampholytic antistatic agent include alkyl betaine types, alkyl imidazoline types and alkyl alanine types. Of these, any one kind or a mixture of plural kinds thereof can be used.

Examples of the conductive resin antistatic agent include polyvinyl benzyl type cations and polyacrylic acid type cations. Of these, any one kind or a mixture of plural kinds thereof can be used.

The foregoing antistatic agent for thermoplastic resin which has hitherto been known varies depending upon its kind, a level of antistatic properties to be required and the kind of the resin to be imparted with antistatic properties. In general, its content is preferably in the range of from 0.1% by weight to 10% by weight, and more preferably in the range of from 1% by weight to 5% by weight relative to the resin to be imparted with antistatic properties.

Also, in the antistatic resin composition, in addition to the foregoing antistatic agent for thermoplastic resin, for example, an inorganic filler which has hitherto been known and the like can also be added for the purpose of devising to enhance the mechanical strength.

Examples of the inorganic filler which has hitherto been known include crystalline silica, fused silica, alumina, magnesia, talc, mica, kaolin, clay, diatomaceous earth, calcium silicate, titanium oxide, glass fibers, calcium fluoride, calcium sulfate, barium sulfate, calcium phosphate, carbon fibers, carbon nanotubes and potassium titanate fibers. Of these, any one kind or a mixture of plural kinds thereof can be used. Of these inorganic fillers, it is preferred to use talc, mica, carbon, glass or carbon nanotubes.

In the case of adding an inorganic filler, the content of the inorganic filler is in the range of from 0.1% by weight to 90% by weight, preferably in the range of from 0.5% by weight to 50% by weight, and more preferably in the range of from 1% by weight to 30% by weight relative to the antistatic resin composition.

By controlling the content of the inorganic filler at 0.1% by weight or more, a lowering of an effect for improving the rigidity or antistatic properties of the antistatic resin composition can be prevented from occurring. Also, by controlling the content of the inorganic filler at not more than 90% by weight, the generation of faults such as a lowering of fluidity of the antistatic resin composition molten in injection molding the antistatic resin composition and a lowering of the mechanical strength can be prevented from occurring.

Moreover, in the antistatic resin composition, in addition to the foregoing antistatic agent, for example, an antioxidant (for example, phenol based, phosphorus based and sulfur based antioxidants), a flame retardant, an ultraviolet ray absorber, a photo-stabilizer, a plasticizer, a compatibilizing agent, a coloring agent (for example, pigments and dyes), an antifungal agent, a hydrolysis inhibitor, a surface treating agent, etc, can also be added for the purpose of improving injection moldability, impact resistance, appearance, thermal resistance, weather resistance, rigidity, etc.

The foregoing antistatic resin composition can be obtained by substantially uniformly dispersing the foregoing antistatic agent 1 for thermoplastic resin, resin to be imparted with antistatic properties and other additives, etc. by a kneading unit, for example, a tumbler, a ribbon blender, a mixer, an extruder, a kneader, etc. and then molding in a prescribed shape by a molding process such as injection molding, injection compression molding, extrusion molding, blow molding, vacuum molding, press molding, expansion molding, supercritical molding, etc.

The foregoing antistatic resin composition is excellent in antistatic properties because in view the fact that the antistatic agent 1 for thermoplastic resin in which the sulfonate group is introduced only into the surface layer of the inner layer part 2 composed of the foregoing polymer, thereby forming the surface layer part 3 is added, the hygroscopicity of the added antistatic agent 1 for thermoplastic resin is low, blocking between the particles does not occur, and the blending properties with the resin to be imparted with antistatic properties (thermoplastic resin) are good.

Also, in view of the fact that the antistatic agent 1 for thermoplastic resin is added, the antistatic resin composition is excellent in an antistatic effect, is able to reveal the antistatic properties for a long period of time and is excellent in durability and handling properties.

Molded articles made of such an antistatic resin composition are used in various fields as a case or a member having antistatic properties imparted thereto in various products, for example, household electrical appliances, automobile products, information equipment, office equipment, telephones, stationeries, furniture, fibers, etc.

EXAMPLES

Examples of an antistatic resin for thermoplastic resin and an antistatic resin composition to which the present embodiments are applied and Comparative Examples for comparison relative to the Examples are hereunder described.

First of all, samples and comparative samples as an antistatic agent for thermoplastic resin, which are contained in the Examples and Comparative Examples, were prepared.

Sample 1

Pellets of a polystyrene resin (styrene unit: 100% by mole) having a weight average molecular weight (Mw) of 280,000 were subjected to freeze pulverization (using liquid nitrogen) by a lab pulverizer and passed through an 80-mesh screen to form a powder. Also, a product passing through an 80-mesh screen was found to account for 99% by weight.

20 g of this powder was charged into an eggplant type flask, which was then installed with a rotary evaporator, heated at 60° C. and rotated. At that time, the polystyrene resin powder became in a fluidized state within the flask due to the rotation of the evaporator.

Subsequently, deaeration of the flask was carried out by a vacuum pump (evacuated to about 0.1 kPa) and hermetically sealed.

Subsequently, an $SO_3$ gas was fed into the deaerated flask from an $SO_3$ tank (filled with 3 g of $SO_3$) which had been previously heated at 60° C. through the operation of a valve. At that time, though the pressure within the flask immediately reached an atmospheric pressure due to the injection of the $SO_3$ gas, the pressure became in a reduced pressure state step by step with the progress of the reaction, and therefore, an $SO_3$ gas was again blown. By repeating this operation, all of 3 g of the $SO_3$ gas was blown into the flask. After achieving the reaction at 60° C. for 4 hours, the $SO_3$ gas within the flask was substituted with nitrogen.

Subsequently, a potassium hydroxide aqueous solution was charged into the flask to achieve neutralization of a sulfonated product (adjusted at a pH of 7), and the sulfonated product was filtered through a glass filter.

Thereafter, the filtration product was washed with water, again filtered and then dried by an air-circulation dryer (at 100° C.) to obtain 23 g of a white powder (Sample 1).

Sample 1 was analyzed for a sulfur content. As a result, the sulfur content was found to be 2.10% by weight. Also, as a result of the measurement by means of TOF-SIMS, it was confirmed that a thickness of the layer (surface layer part 3) into which potassium sulfonate had been introduced was 6.7% relative to the diameter of the antistatic agent particle for thermoplastic resin.

Figure 4A:
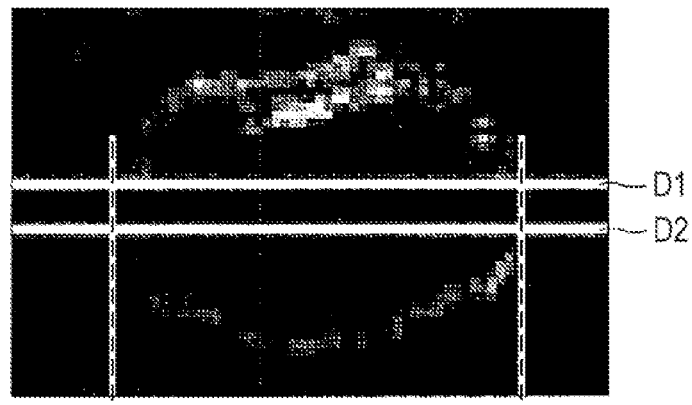
Figure 4B:
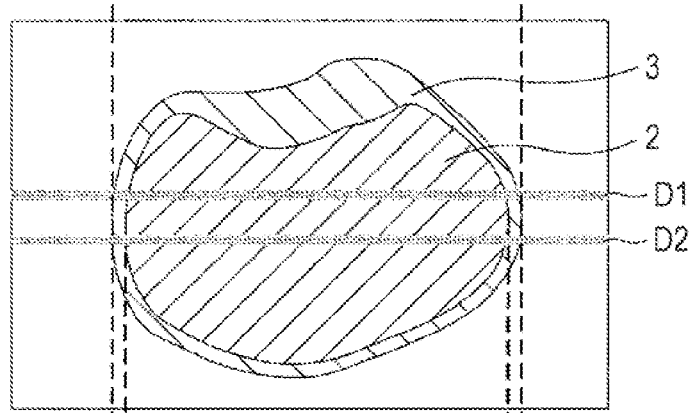
Figure 4C:
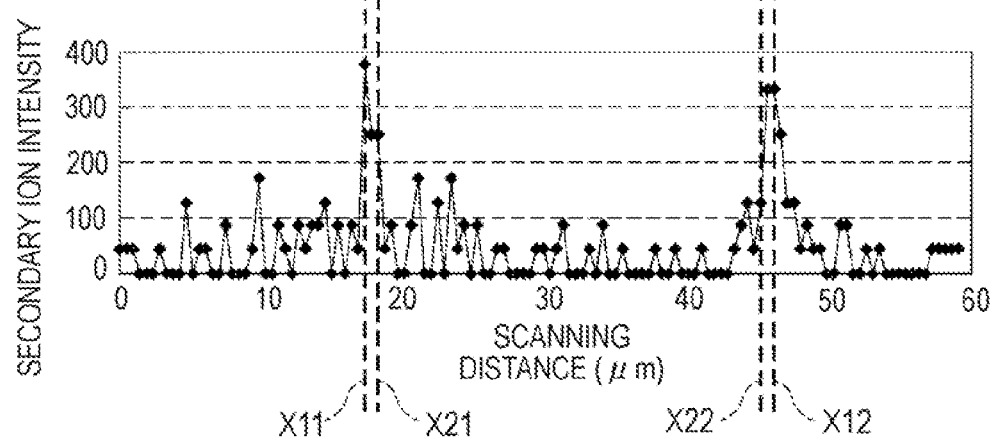

As a result of measuring a section of the antistatic agent particle for thermoplastic resin of Sample 1 by means of TOF-SIMS, the results shown in FIGS. 4A, 4B and 4C were obtained. FIG. 4A is a photograph of the section of the antistatic agent particle for thermoplastic resin, and FIG. 4B schematically shows FIG. 4A. Also, FIG. 4C shows the distribution of secondary ion intensity of a sulfur element in a region surrounded by lines D1 and D2 in FIGS. 4A and 4B. The scanning distances X11 and X12 shown in FIG. 4C represent positions of outer edges of the antistatic agent particle for thermoplastic resin, and the scanning distances X21 and X22 each represents a position of an interface between the inner layer part 2 and the surface layer part 3. According to this, it was confirmed that in view of the fact that the potassium sulfonate group was bonded to the surface layer of the inner layer part 2, the surface layer part 3 was formed. Also, in that case, a proportion of the thickness of the surface layer part 3 is determined as follows. It is noted that the proportion of the thickness of the surface layer part 3 is [(depth at which S is detected from the periphery)/(particle size)]×100=[(2 μm)/(30 μm)]×100=6.7%.

The foregoing analysis and measurement by means of TOF-SIMS of a sulfur content were also carried out with the following Samples and Comparative Samples.

Sample 2

In Sample 2, the same polystyrene resin powder as in Sample 1 was used, and a chemical treatment was carried out in the same manner as in Sample 1, except for changing the injection amount of the $SO_3$ gas to 0.5 g, thereby introducing a sulfonate group into the surface layer of the polystyrene resin powder. The obtained Sample 2 was a pale yellow powder, and the sulfur content was found to be 0.69% by weight.

Sample 3

In Sample 3, the same polystyrene resin powder as in Sample 1 was used, and a chemical treatment was carried out in the same manner as in Sample 1, except for changing the injection amount of the $SO_3$ gas to 10 g, thereby introducing a sulfonate group into the surface layer of the polystyrene resin powder. The obtained Sample 3 was a brown powder, and the sulfur content was found to be 5.80% by weight.

Sample 4

In Sample 4, first of all, the same polystyrene resin powder as in Sample 1 was used, and a chemical treatment was carried out in the same manner as in Sample 1, except for changing the injection amount of the $SO_3$ gas to 1 g. A sodium hydroxide aqueous solution was charged into the obtained sulfonated product to achieve neutralization of the sulfonated product (adjusted at a pH of 7), and the sulfonated product was filtered through a glass filter, thereby introducing a sulfonate group into the surface layer of the polystyrene resin powder.

Thereafter, the filtration product was washed with water, again filtered and then dried by an air-circulation dryer (at 100° C.) to obtain a white powder. The obtained Sample 4 was a pale yellow powder, and the sulfur content was found to be 0.69% by weight.

Sample 5

In Sample 5, a transparent reel waste (AS resin) of a spent video cassette for business use having a weight average molecular weight (Mw) of 110,000 (reduced as polystyrene) and having an acrylonitrile unit of 43% by mole and a styrene unit of 57% by mole was used as a raw material. In this powder, a product passing through an 80-mesh screen was found to account for 98% by weight. A chemical treatment was carried out in the same manner as in Sample 1, except for changing the injection amount of the $SO_3$ gas into the powder to 3 g, thereby introducing a sulfonate group into the surface layer of the AS resin powder. The obtained Sample 5 was a pale yellow powder, and the sulfur content was found to be 2.20% by weight. Also, as a result of the measurement by means of TOF-SIMS, it was confirmed that a thickness of the layer (surface layer part 3) into which potassium sulfonate had been introduced was 8.5% relative to a length of the diameter of the antistatic agent particle for thermoplastic resin.

Sample 6

In Sample 6, the same resin powder as in Sample 5 was used, and a chemical treatment was carried out in the same manner as in Sample 1, except for changing the injection amount of the $SO_3$ gas to 0.5 g, thereby introducing a sulfonate group into the surface layer of the AS resin powder. The obtained Sample 6 was a pale yellow powder, and the sulfur content was found to be 0.63% by weight.

Sample 7

In Sample 7, first of all, the same resin powder as in Sample 5 was used, and a chemical treatment was carried out in the same manner as in Sample 1, except for changing the injection amount of the $SO_3$ gas to 2 g. A sodium hydroxide aqueous solution was charged into the obtained sulfonated product to achieve neutralization of the sulfonated product (adjusted at a pH of 7), and the sulfonated product was filtered through a glass filter, thereby introducing a sulfonate group into the surface layer of the AS resin powder.

Thereafter, the filtration product was washed with water, again filtered and then dried by an air-circulation dryer (at 100° C.) to obtain a white powder. The obtained Sample 7 was a pale yellow powder, and the sulfur content was found to be 1.29% by weight.

Sample 8

In Sample 8, the same resin powder as in Sample 5 was used, and a chemical treatment was carried out in the same manner as in Sample 7, except for changing the injection amount of the $SO_3$ gas to 5 g, thereby introducing a sulfonate group into the surface layer of the AS resin powder. The obtained Sample 8 was a pale brown powder, and the sulfur content was found to be 3.26% by weight.

Comparative Sample 1

In Comparative Sample 1, commercially available poly (sodium styrene sulfonate) (weight average molecular weight: 70,000, sulfur content: 15.3% by weight) was used.

In Comparative Sample 1, as a result of the measurement by means of TOF-SIMS, it was confirmed that a thickness of the layer into which sodium sulfonate had been introduced was 100% (entire surface) relative to the diameter of the antistatic agent particle for thermoplastic resin.

Figure 5A:
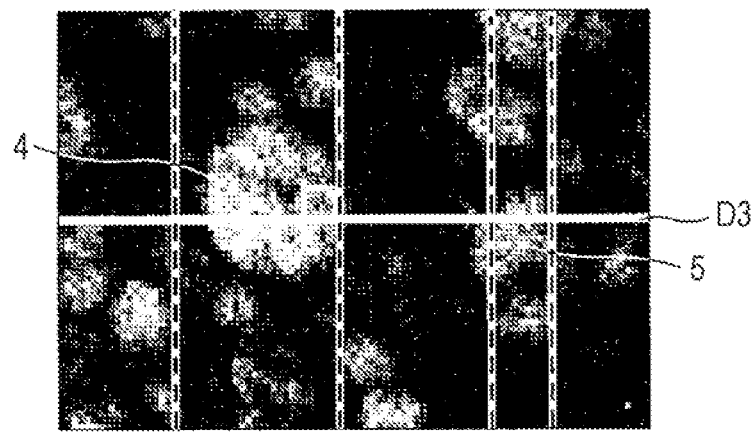
Figure 5B:
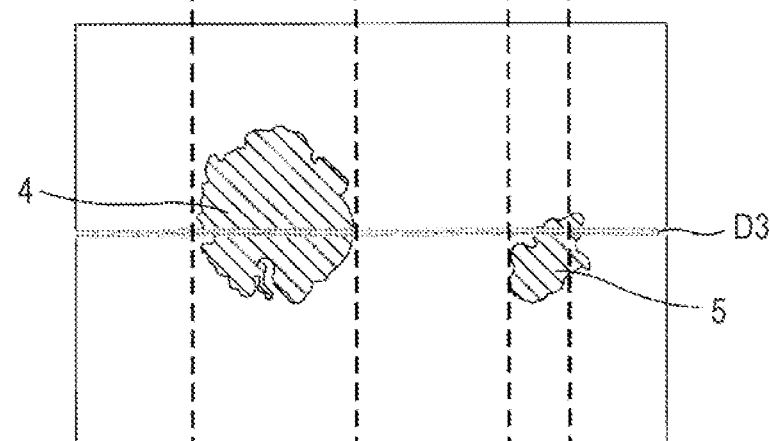
Figure 5C:
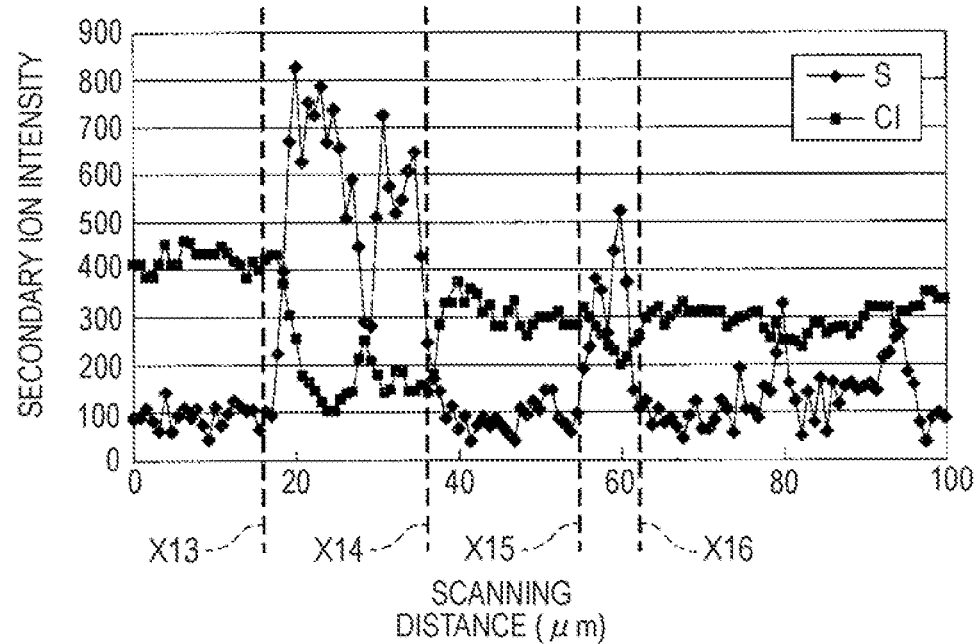

As a result of measuring a section of the antistatic agent particle for thermoplastic resin of Comparative Sample 1 by means of TOF-SIMS, the results shown in FIGS. 5A, 5B and 5C were obtained. FIG. 5A is a photograph of the section of the antistatic agent particle for thermoplastic resin, and FIG. 5B schematically shows FIG. 5A. Also, FIG. 5C shows the distribution of secondary ion intensity of a sulfur element in a region surrounded by a line D3 in FIGS. 5A and 5B. Scanning distances X13 and X14 shown in FIG. 5C represent positions of outer edges of an antistatic agent particle 4 for thermoplastic resin, and scanning distances X15 and X16 represent outer edges of positions of an antistatic agent particle 5 for thermoplastic resin. In Comparative Sample 1, a surface layer part as seen in Sample 1 and so on was not formed in the surface layer of the inner surface part. A proportion of the thickness of the antistatic agent particle 4 for thermoplastic resin into which sodium sulfonate had been introduced is [(depth at which S is detected from the periphery)/(particle size)]×100=[(16 μm)/(16 μm)]×100=100%. Also, a proportion of the thickness of the antistatic agent particle 5 for thermoplastic resin into which sodium sulfonate had been introduced is [(depth at which S is detected from the periphery)/(particle size)]×100=[(7 μm)/(7 μm)]×100=100%.

Comparative Sample 2

In Comparative Sample 2, commercially available poly (sodium styrene sulfonate) (weight average molecular weight: 500,000, sulfur content: 17.3% by weight) was used. In Comparative Sample 2, as a result of the measurement by means of TOF-SIMS, it was also confirmed that a thickness of the layer into which sodium sulfonate had been introduced was 100% relative to the diameter of the antistatic agent particle for thermoplastic resin.

Each of the foregoing sulfonated samples was blended as a sulfonate based antistatic agent for thermoplastic resin with a polycarbonate (PC) resin as described below, and the obtained antistatic resin composition was measured with respect to the following various resin characteristics. The results obtained are shown in Table 1.

For the resin to be imparted with antistatic properties, a PC resin: general-purpose grade (medium molecular weight PC resin, weight average molecular weight: 43000 reduced as polystyrene by a GPC method) was used.

The evaluation of hygroscopicity was carried out by confirming the particle state (for example, fluidity, size, etc.) of the antistatic agent for thermoplastic resin after allowing it to stand for 24 hours in a state that a cap of a reagent bottle was opened.

The evaluation of blending properties was carried out by confirming the blending properties between the PC resin and the powdered antistatic agent for thermoplastic resin by a single-screw kneading extruder (manufactured by Imoto Machinery Co., Ltd.).

With respect to the evaluation of antistatic properties, a specimen (39 mm×39 mm×1 mm) was prepared from an antistatic resin composition prepared by blending the PC resin and the powdered antistatic agent for thermoplastic resin, this specimen was stored in an experimental laboratory at a temperature of 20° C. and a relative humidity of 35%, and a volume resistivity X (Ω/cm) of a plate-shaped sample was then measured under the same condition at an applied voltage of 500 V for an applied time of 60 seconds by using a resistance analyzer (High-Resistance Meter 4339B, manufactured by Agilent Technologies).

TABLE 1

| | Composition | Example 1 | Comparative Example 1 | Comparative Example 2 |
|---|---|---|---|---|
| | Polycarbonate resin | 100 wt % | 100 wt % | 100 wt % |
| Sulfonic group-containing polymer | Sample No. | Sample 1 | Comparative Sample 1 | — |
| | Amount of sulfur (rate of introduction) | 2.10% | 15.30% | — |
| | Metal salt | K | Na | — |
| | Blocking between particles | No | Yes | — |
| | Blending amount | 3.5 wt % | 3.5 wt % | — |
| | Blending properties | Good | Good | — |
| | Resin rigidity | Good | Poor | Good |
| | Volume resistivity | $1 \times 10^{16}$ | $1 \times 10^{17}$ | $3 \times 10^{17}$ |

TABLE 2

| | Composition | Example 2 | Example 3 | Example 4 | Example 5 | Example 6 | Comparative Example 3 | Comparative Example 4 |
|---|---|---|---|---|---|---|---|---|
| | Polycarbonate resin | 100 wt % | 100 wt % | 100 wt % | 100 wt % | 100 wt % | 100 wt % | 100 wt % |
| Sulfonic group-containing polymer | Sample No. | Sample 1 | Sample 2 | Sample 3 | Sample 1 | Sample 4 | Comparative Sample 1 | Comparative Sample 2 |
| | Amount of sulfur (rate of introduction) | 2.10% | 0.69% | 5.80% | 2.10% | 0.85% | 15.30% | 17.30% |
| | Metal salt | K | K | K | K | Na | Na | Na |
| | Blocking between particles | No | No | No | No | No | Yes | Yes |
| | Blending amount | 60 wt % | 60 wt % | 60 wt % | 80 wt % | 60 wt % | 60 wt % | 60 wt % |
| | Blending properties | Good | Good | Good | Good | Good | Poor | Poor |
| | Resin rigidity | Good | Good | Good | Good | Good | Poor | Poor |
| | Volume resistivity | $8 \times 10^{12}$ | $5 \times 10^{15}$ | $3 \times 10^{12}$ | $1 \times 10^{12}$ | $1 \times 10^{15}$ | $3 \times 10^{15}$ | $5 \times 10^{14}$ |

With respect to Example 1 and Comparative Example 1 in Table 1, the antistatic agent for thermoplastic resin and the antistatic resin composition having the antistatic agent for thermoplastic resin added thereto are compared under the same condition while using Sample 1 and Comparative Sample 1 to be compared, respectively.

As is clear from the results shown in Table 1, Sample 1 was low in the hygroscopicity and even when allowed to stand in an open system, was free from the generation of blocking between particles, whereas Comparative Sample 1 caused the generation of blocking between particles. In Comparative Sample 1, as a result of the measurement after standing for 24 hours, the weight increased by 10% by weight as compared with that at the time of start (the increase in weight of Sample 1 was less than 1%). This is because in Sample 1, potassium sulfonate was introduced only into the surface layer of the particle composed of a polystyrene resin, and therefore, the water absorption properties were low so that blocking was prevented from occurring. On the other hand, in Comparative Sample 1, the sulfonate group was introduced even into the inside, and therefore, the water absorption properties became high so that blocking was generated.

Also, as is clear from the results shown in Table 1, when Example 1 in which 3.5% by weight of Sample 1 was blended with the 100% by weight of the PC resin was compared with Comparative Example 2 composed of only a single body of the PC resin, in Example 1, a lowering of the volume resistivity could be confirmed by the addition of Sample 1. Also, when Example 1 was compared with Comparative Example 1 in which 3.5% by weight of Comparative Sample 1 was blended, nevertheless Example 1 was lower than Comparative Example 1 with respect to the amount of sulfur, a reduction of the volume resistivity could be confirmed. Furthermore, nevertheless Comparative Example 1 was equal to Example 1 with respect to the addition amount, the resin rigidity was lowered.

Next, various resin characteristics of Examples 2 to 6 using Samples 1 to 4 and Comparative Examples 3 and 4 using Comparative Samples 1 and 2 were measured. The results obtained are shown in Table 2.

As is clear from the results shown in Table 2, when Examples 2 to 4 and Example 6 in which 60% by weight of Samples 1 to 4 were each blended with the 100% by weight of the PC resin and Example 5 in which 80% by weight of Sample 1 was blended with the 100% by weight of the PC resin were compared with Comparative Examples 3 and 4 in which 60% by weight of Comparative Samples 1 and 2 were each blended with the 100% by weight of the PC resin, nevertheless Examples 2 to 4 were lower than Comparative Examples 3 and 4 with respect to the amount of sulfur, a significant reduction of the volume resistivity could be confirmed. On the other hand, nevertheless Comparative Examples 3 and 4 were equal to Examples 2 to 4 with respect to the addition amount, the resin rigidity was lowered, and blending was difficult. Also, in Example 5 having 80% by weight of Sample 1 blended therein, the volume resistivity was significantly reduced, and a reduction of the resin rigidity could not be confirmed. It may be considered that in particular, in each of the antistatic agents for thermal resin of Examples 2 to 5, only the surface layer is sulfonated, and therefore, the thermoplastic resin portion of the antistatic agent for thermoplastic resin is melted by heating at the time of blending, thereby enhancing the blending properties.

Furthermore, in Example 6 in which the introduced sulfonate group is sodium sulfonate, nevertheless the rate of introduction of a sulfonate group is lower than that in Comparative Examples 3 and 4 using the same sodium sulfonate, the volume resistivity was equal to that in Comparative Examples 3 and 4.

Next, with respect to Examples 7 to 10 using Samples 5 to 8, the results obtained by measuring various resin characteristics are shown in Table 3, while comparing and evaluating those of Comparative Examples 3 and 4 using Comparative Samples 1 and 2.

TABLE 3

| Composition | | Example 7 | Example 8 | Example 9 | Example 10 | Comparative Example 3 | Comparative Example 4 |
|---|---|---|---|---|---|---|---|
| Polycarbonate resin | | 100 wt % | 100 wt % | 100 wt % | 100 wt % | 100 wt % | 100 wt % |
| Sulfonic group-containing polymer | Sample No. | Sample 5 | Sample 6 | Sample 7 | Sample 8 | Comparative Sample 1 | Comparative Sample 2 |
| | Amount of sulfur (rate of introduction) | 2.20% | 0.63% | 1.29% | 3.26% | 15.30% | 17.30% |
| | Metal salt | K | K | Na | Na | Na | Na |
| | Blocking between particles | No | No | No | No | Yes | Yes |
| | Blending amount | 60 wt % | 60 wt % | 60 wt % | 60 wt % | 60 wt % | 60 wt % |
| | Blending properties | Good | Good | Good | Good | Poor | Poor |
| | Resin rigidity | Good | Good | Good | Good | Poor | Poor |
| | Volume resistivity | $6 \times 10^{12}$ | $4 \times 10^{15}$ | $5 \times 10^{15}$ | $3 \times 10^{14}$ | $3 \times 10^{15}$ | $5 \times 10^{14}$ |

As is clear from the results shown in Table 3, when Examples 7 and 8 in which 60% by weight of Samples 5 and 6 were each blended with the 100% by weight of the PC resin were compared with Comparative Examples 3 and 4 in which 60% by weight of Comparative Samples 1 and 2 were each blended with the 100% by weight of the PC resin, nevertheless Examples 7 and 8 were lower than Comparative Example 3 and 4 with respect to the amount of sulfur, a significant reduction of the volume resistivity could be confirmed. On the other hand, nevertheless Comparative Examples 3 and 4 were equal to Examples 7 and 8 with respect to the addition amount, the resin rigidity was lowered, and blending was difficult.

Furthermore, in Examples 9 and 10 in which the introduced sulfonate group is sodium sulfonate, nevertheless the rate of introduction of a sulfonate group is lower than that in Comparative Examples 3 and 4 using the same sodium sulfonate, the volume resistivity was equal to that in Comparative Examples 3 and 4.

It is noted from the foregoing results that the powered antistatic agents for thermoplastic resin of Samples 1 to 8 to which the present embodiments are applied and the antistatic resins containing such an antistatic resin for thermoplastic resin are every excellent in handing, blending properties and antistatic properties.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An antistatic agent for a thermoplastic resin comprising: a sulfonate group introduced into a surface layer part of an aromatic ring-containing thermoplastic resin particle, wherein the aromatic ring-containing thermoplastic resin has a weight average molecular weight of from 100,000 to 300,000.

2. The antistatic agent for a thermoplastic resin according to claim 1, wherein
the sulfonate group is contained in an amount of from 0.6% by weight to 6.0% by weight in terms of a sulfur content.

3. The antistatic agent for thermoplastic resin according to claim 1, wherein
the aromatic ring-containing thermoplastic resin includes at least one member of polystyrene (PS), high-impact polystyrene (HIPS: a styrene-butadiene copolymer), an acrylonitrile-styrene copolymer (AS), an acrylonitrile-butadiene-styrene copolymer (ABS), an acrylonitrile-styrene-acrylate copolymer (ASA), an acrylonitrile-ethylene propylene rubber-styrene copolymer (AES), an acrylonitrile-ethylene-propylene-diene-styrene resin (AEPDMS), polycarbonate (PC), polyphenylene oxide (PPO), polyethylene terephthalate (PET) and polybutylene terephthalate (PBT).

4. An antistatic resin composition comprising: an antistatic agent for a thermoplastic resin having a sulfonate group introduced into a surface layer part of an aromatic ring-containing thermoplastic resin particle; and a thermoplastic resin, wherein the aromatic ring-containing thermoplastic resin has a weight average molecular weight of from 100,000 to 300,000.

5. The antistatic resin composition according to claim 4, wherein
the sulfonate group is contained in the antistatic agent for thermoplastic resin in an amount of from 0.6% by weight to 6.0% by weight in terms of a sulfur content.

6. The antistatic resin composition according to claim 4, wherein
the antistatic agent for thermoplastic resin is contained in an amount of from 3.5% by weight to 80% by weight in the thermoplastic resin to which the antistatic agent for thermoplastic resin is added.

7. The antistatic resin composition according to claim 4, wherein
the thermoplastic resin to which the antistatic agent for thermoplastic resin is added is at least one member of polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polybutylene terephthalate (PBT), polysulfone (PSF), nylon, polylactic acid (PLA) and a liquid crystal polymer (LCP).

8. The antistatic resin composition according to claim 4, wherein
the thermoplastic resin to which the antistatic agent for thermoplastic resin is added is a mixture of at least one member of polycarbonate (PC), an acrylonitrile-butadiene-styrene copolymer (ABS), polystyrene (PS), an acrylonitrile-styrene copolymer (AS), polyvinyl chloride (PVC), polyphenylene oxide (PPO), polyethylene terephthalate (PET), polybutylene terephthalate (PBT), polysulfone (PSF), nylon, polylactic acid (PLA) and LCP (liquid crystal polymer); and at least one member of a natural rubber (NR), IR (isoprene rubber), a butadiene rubber (BR), a chloroprene rubber (CR), a nitrile rubber (NBR), a hydrogenated nitrile rubber (HNBR), a butyl rubber (IIR), an ethylene rubber (EPDM), a silicone rubber (Q) and a thermoplastic elastomer (TPE).

* * * * *